May 7, 1968 G. A. DOTTO 3,382,382

TWO-SPEED SYNCHRONOUS MOTOR

Filed Feb. 12, 1965 4 Sheets-Sheet 1

INVENTOR
GIANNI A. DOTTO
BY
ATTORNEY

INVENTOR.
GIANNI A. DOTTO
BY Robert Gunine
ATTORNEY

May 7, 1968

G. A. DOTTO 3,382,382

TWO-SPEED SYNCHRONOUS MOTOR

Filed Feb. 12, 1965

INVENTOR
GIANNI A. DOTTO

BY Robert Gemme

ATTORNEY

United States Patent Office 3,382,382
Patented May 7, 1968

3,382,382
TWO-SPEED SYNCHRONOUS MOTOR
Gianni A. Dotto, Dayton, Ohio, assignor to P. R. Mallory
& Co. Inc., Indianapolis, Ind., a corporation of Delaware
Filed Feb. 12, 1965, Ser. No. 432,327
19 Claims. (Cl. 310—37)

ABSTRACT OF THE DISCLOSURE

A low wattage prime mover including an electrical input means, a coil, at least one oscillating armature, one-way clutch means cooperatively associated with said armature or armatures and a rotatably displaceable shaft driven by said armature or armatures through said one-way clutch means.

---

The present invention relates to low wattage prime movers, more particularly to a low wattage, slow speed electric motor comprising at least one, preferably a plurality of balanced oscillating armatures and a one-way clutch operatively associated with each of the oscillating armatures. The combination of the balanced oscillating armatures and cooperatively associated one-way clutches converts a pulsating electrical energy into a unidirectional, rotational mechanical output. The low wattage prime mover of the present invention provides a torque output which is thought to be forty to sixty times greater than the torque output of a conventional synchronous motor having substantially the same physical dimensions. The torque so developed at a slow speed may be utilized to actuate sequential time control devices. The sequential control device generally includes a periodic switch means that regulates the time sequence of operations in a washing machine and other similar devices. However, the sequential time control device generally uses a synchronous motor that incorporates therein a gear train means used to reduce the high rotational speed of the shaft to a slower, more advantageous speed. The device of the present invention substantially eliminates the necessity for using an intermediate speed reduction means such as the gear train means normally utilized with the conventional synchronous motor in the sequential time control means.

It is desirable that a prime mover used in conjunction with a sequential control means incorporate therein the characteristics of high torque, slow speed rotational output, small physical dimensions, and balanced armatures. The rotary motion output of the slow moving shaft is utilized to actuate the components of the sequential time control means such as a switch means that includes a plurality of cams and operatively associated cam follower switches. The switch means has been used in the timer art to sequentially activate electrically associated electrical circuitry.

It is seen that the low wattage prime mover of the present invention would necessarily include an electrical input means, a coil, two balanced oscillating armatures, a one-way clutch operatively associated with each of said armatures, and a rotatable shaft capable of driving a switch means that sequentially actuates a plurality of electrical circuits.

Several prime movers presently available are utilized to translate a pulsating electrical energy input into a rotary output and are used in conjunction with a switch means to provide a sequential time control device. However, these several prime movers are of the synchronous motor type that utilize a complicated and expensive gear reduction system to reduce the high rotation speed of the shaft of the synchronous motor to a desired slow, rotational speed. Characteristically, the synchronous motor utilizes a large and bulky coil and armature to achieve the required torque output.

In contrast to the bulky synchronous motors that require complicated and expensive gear reduction systems, if the synchronous motors are to be utilized in control timers, the present invention provides a prime mover means whereby the permanent magnet synchronous motor and gear reduction system is replaced by a coil, a plurality of balanced oscillating armatures, a plurality of one-way clutches, and a rotatable shaft. The invention comprises a simple, efficient, inexpensive, accurate, effective and compact low wattage motor that includes a shaft rotated unidirectionally at a slow speed without the use of an intermediate gear reduction system or the like yet having a high torque output. The slow moving shaft having a high torque characteristic provides a driving force that actuates cam operated switches that in turn control the sequential operation of the plurality of electrical circuits cooperatively associated with a sequential time control device.

In addition, the present invention provides a novel one-way clutch that includes the property of being capable of alternately locking and releasing a rotatable shaft within four minutes of a degree. The one-way clutch utilizes a novel seat configuration for a plurality of roller bearings in cooperative relationship with substantially V-shaped springs that includes a crotch portion that is substantially three-quarter circular shaped. Several presently available clutches do not possess the property of locking and thereafter releasing a shaft within four minutes of a degree but rather these several presently available clutches lock and thereafter release a shaft within a degree or more. The inability of these several clutches to lock and subsequently release a shaft within several minutes of a degree would introduce appreciable error into a sequential time control device if used in conjunction with such a device.

The novel one-way clutch utilizes an odd number of bearings equally spaced about the periphery of the shaft. It was found that if an even number of bearings were equally spaced about the periphery of the shaft, the bearings were subjected to excessive wear which substantially reduced the effective life of the respective bearing. In addition, it was found that the shaft was subjected to deleterious oscillations along its longitudinal axis. The axial oscillations introduced error into the sequential time control device. Axial oscillation of the shaft cannot be tolerated if accurate operating results are to be achieved. It was found that by utilizing an odd number of bearings and equally spacing each bearing from its sister bearing about the periphery of a rotatable shaft such that a plane passing through the longitudinal axis of the center of any one of the bearings does not pass through the center of any other sister bearing, the clutch possessed a self-centering characteristic with respect to the shaft thus substantially eliminating the deleterious oscillations of the shaft. It was found that the effective life of the bearings was substantially increased by utilizing an odd number of equally spaced bearings.

Accordingly, it is an object of the present invention to provide a quiet, low wattage prime mover including a shaft that is unidirectionally rotated at a variable slow speed.

A further object of the present invention is to provide a novel speed regulating means wherein the rotational speed of the shaft can be effectively regulated.

Yet another object of the present invention is to provide a prime mover including two balanced armatures moving in opposite directions thereby substantially eliminating vibratory effects generally associated with some single armature prime movers.

Another object of the present invention is to provide a one-way clutch assembly that is free wheeling when rotated in a first direction with respect to a shaft and locked with the shaft when rotated in a second direction.

Yet another object of the present invention is to provide a compact oscillatory armature prime mover including a simple and effective means for regulating the arcuate displacement of the operatively associated armature.

A further object of the present invention is to provide a prime mover having optimum reliability characteristics afforded by a construction having a minimum number of parts.

Still another object of the present invention is to provide a simple, efficient, and practical prime mover for sequential time control devices.

Another object of the present invention is to provide a prime mover possessing improved operating characteristics.

Yet still another object of the present invention is to provide a prime mover having a substantially constant high torque output.

The present invention in another of its aspects, relates to novel features of the instrumentalities of the invention described therein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel construction, combination, arrangement and cooperation of elements as hereinafter described and more particularly as defined in the appended claims.

The appended drawings illustrate several novel and different embodiments of the present invention constructed to function in the most advantageous modes devised for the practical application of the basic principles involved in the hereinafter described invention.

Figure 1:
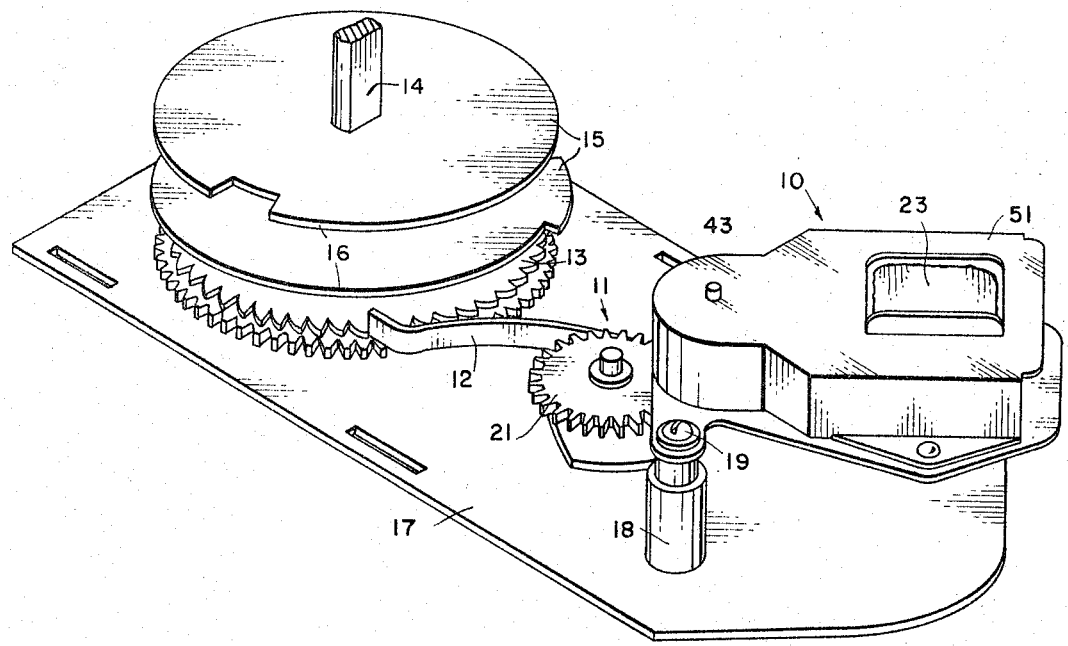
FIGURE 1 is a perspective view of the prime mover means operatively coupled to a cam means by an escapement means.
Figure 2:
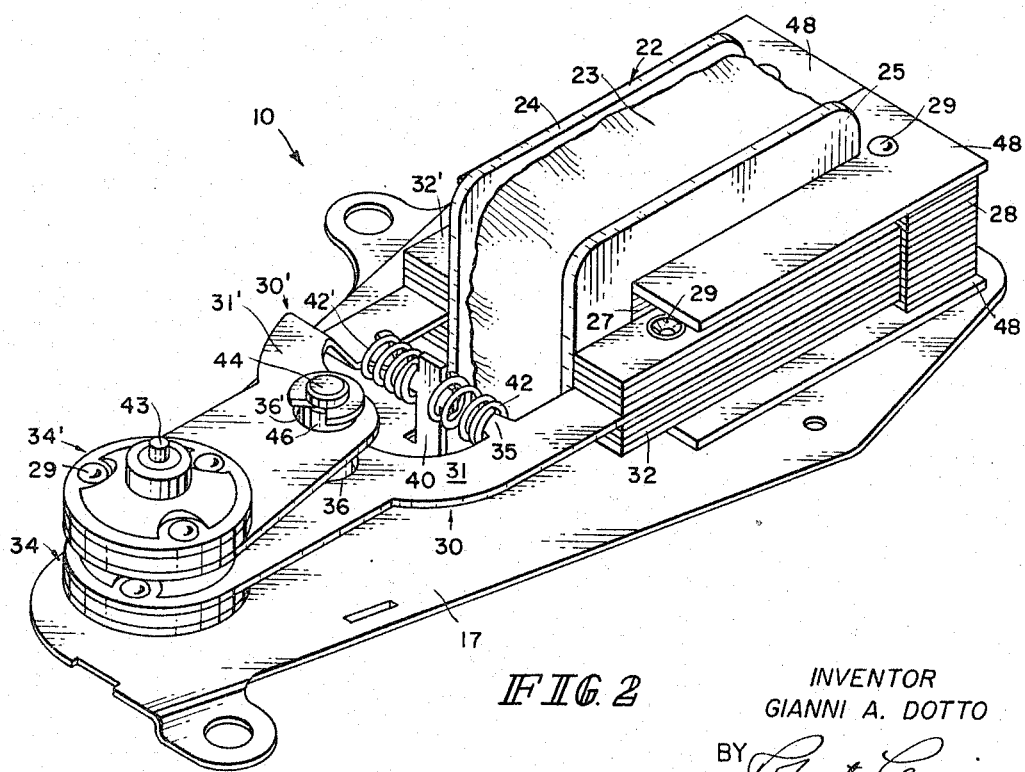
FIGURE 2 is a perspective view of the prime mover means.

Generally speaking, the present invention comprises a means and method for providing a slow speed electric motor having the characteristic of high torque for its size and not subject to deleterious vibration experienced by prior art devices. The slow speed electric motor includes a coil energized by a pulsating such as an alternating current. A pulsating magnetic flux is developed by said alternating current passing through the turns of the coil. A laminated core interfits with an aperture of the coil. It is seen that the core provides a plurality of field pole faces. At least one lamination carrying armature is cooperatively associated with the coil such that an interaction between the pulsating magnetic flux of the coil and the armature causes the armature to oscillate. A one-way clutch means is connected to the armature and to the shaft. The clutch is used for translating the oscillatory motion of the armature to a unidirectional motion. The unidirectional motion is utilized to arcuately displace the shaft in a predetermined direction at a predetermined speed. A speed regulating means is used in conjunction with the electric motor for varying the speed of the shaft.

More particularly, the electric motor of the present invention uses a double armature in one embodiment and a single armature in the second embodiment. The electric motor includes an output shaft that is rotationally displaced at a slow speed. A coil has electrical connections for applying the alternating current of a source to the coil. A pulsating magnetic flux is developed by the alternating current passing through the turns of the coil. A laminated core is positioned within the aperture of the coil. It is seen that the laminated core provides a plurality of field pole faces. A rectangular piece is located juxtaposition the coil and is utilized to provide a low reluctance path for the magnetic flux. At least one, preferably at least two lamination carrying armatures are located juxtaposition the core and the coil. The laminations of the armatures provide pole faces positioned opposite the field pole faces of the core. Due to the pulsating magnetic flux, attraction occurs between the pole faces of the armature and the field pole faces of the core. The attraction causes one of the armatures to deflect in a first direction and another of the armatures to deflect in a second direction. The deflection of the armatures causes a plurality of spiral spring means to store energy therein. Upon cessation of the flux, the plurality of spiral springs release their stored energy, thereby causing the armatures to return to their respective initial positions. A plurality of one-way clutches coupled each of the armatures to the shaft thereby providing a pivot point for the armatures about the shaft. The respective one-way clutches each include an odd number of roller bearings, a resilient spring cooperatively associated with each of the roller bearings for urging the bearings to a predetermined position, and a seat for the roller bearings. The seat includes an engagement angle that permits the bearings to be free-wheeling in one direction with respect to the shaft and locked with the shaft in a second direction. The respective one-way clutches translate the arcuate displacement of the armatures to a unidirectional, constant motion. The motion arcuately displaces the shaft in a predetermined direction at a constant speed. A means including a post means, an interfitting sleeve means, and an aperture in each of the armatures loosely interfitting with each of the combined post means and sleeve means effectively regulates the arcuate displacement of the armature. A speed regulating means is used for varying the speed of the shaft. The speed regulating means includes a switch means and a diode means. A first position of the switch means is utilized to electrically couple the diode means in series with the coil. When the diode is coupled in series with the coil, the diode eliminates one half of the alternating current cycle thereby reducing the speed of the motor by one half what the speed would be if the full wave was applied to the coil. The second position of switch means allows the full wave to be applied to the coil thereby doubling the speed of the motor over what the speed is if only a one half cycle is applied to the coil.

Now referring to FIGURES 1–5 of the drawings which illustrate the preferred embodiment of the present invention comprising a prime mover or electric motor 10. FIGURE 1 shows the electric motor actuating a leaf spring escapement means 11. The escapement means translates the constant rotary motion output of the electric motor to an intermittent or step-by-step rotary motion output. Since the escapement means may be of any suitable form, of which many are conventionally used, a detailed illustration of the escapement means has been omitted from the drawings in the interest of a clearer showing of the inventive electric motor. The leaf spring arm 12 of the escapement means is utilized to intermittently actuate a ratchet wheel 13. The ratchet wheel is fixedly coupled to cam carrying shaft 14 so that the intermittent rotational displacement of the shaft is directly transferred to a plurality of spaced cams 15 fixedly carried on the shaft. The cams 15 include a periphery 16 of rise and fall contours that are utilized to sequentially actuate a plurality of follower switches (not shown) including follower arms (not shown) riding on the periphery of the cams. The follower switches are utilized to sequentially actuate a plurality of electrical circuits cooperatively associated therewith. As with the escapement means, a detailed illustration of the cams and the cam carrying shaft, and an illustration of the follower switches has been omitted from the drawings in the interest of a clearer showing of the inventive electric motor.

The electric motor 10 is fixedly coupled to mounting frame 17 by a plurality of support means 18 and bolts 19 turned into a threaded aperture (not shown) of each of the support means. Fixedly coupling the electric motor to the mounting frame, serves to predeterminately locate the electric motor with respect to the escapement means so that pinion 20 of the motor meshes with and rotatably drives gear 21 of the escapement means at a constant speed. In addition, securely coupling the electric motor to the mounting frame substantially prevents deleterious horizontal or vertical displacement of the electric motor.

Referring now more particularly to FIGURES 2–5, it is seen that a length of electrically conductive wire (not shown) is wound about spindle 22 to form coil 23. The spindle is fabricated from any suitable insulating material such as plastic or the like. The spindle includes a first flange 24 at one extremity thereof and a second flange 25 at the other extremity of the spindle. The spindle and its associated flanges serve to seat the length of electrically conductive wire wound thereabout to thereby form coil 23. An aperture 26 is centrally located on the axis of the spindle. The aperture 26 has sufficient dimensions so as to accommodate therein laminated core 27. The laminated core is fabricated from any suitable metallic substance such as silicon steel or the like. Laminating the core reduces eddy current losses that may be substantial if the core was not laminated.

In spaced parallel relationship with respect to the axis of the spindle and the axis of the laminated core is a laminated, rectangular shaped piece 28 fabricated from any suitable metal such as silicon steel or the like. The laminated piece 28 provides a low reluctance path for the magnetic flux developed by a pulsating current in the coil. The laminated piece is securely coupled to the mounting frame by any suitable means such as rivets or the like.

Figure 5:
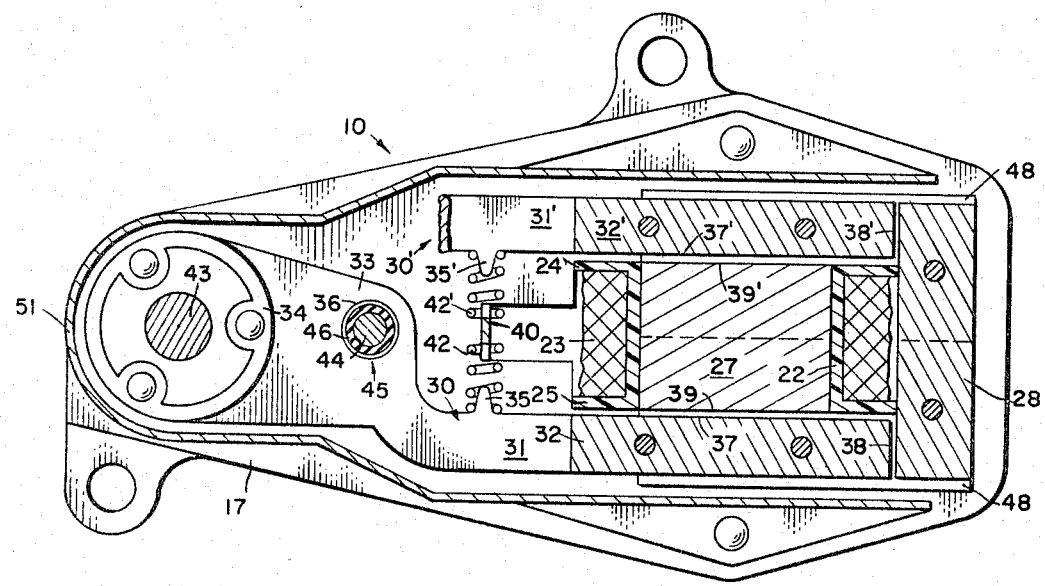
FIGURE 5 is a vertical view taken across the line 5—5 of FIGURE 4 of the prime mover means illustrating the position of the armatures with respect to the coil and the location of the means for regulating the arcuate displacement of an armature.

A first balanced armature 30 is positioned so that the longitudinal axis thereof is perpendicular to the axis of the aperture 26 of the spindle. It is seen that the armature includes an arm 31, a plurality of laminations 32 that are fixedly coupled to the arm by a plurality of securing means such as rivets 29 or the like, a one-way clutch 34, a flared portion 33 that serves to fixedly seat and connect the one-way clutch to the armature, a node 35, and an aperture 36 located in the flared portion 33. The laminations are coupled to the arm on each side thereof and extend the full length of the flange 25 of the spindle. The laminations are fabricated from any suitable metal such as silicon steel or the like. The laminations 32 provide a low reluctance path for the pulsating magnetic field developed by a pulsating current present in the coil when the coil is energized by a pulsating source (not shown) such as an alternating current source or the like. The laminations 32 also provide a first pole face 37 located juxtaposition the field pole face 39 of the core. A second pole face 38 of the laminations 32 is located juxtaposition the laminations of rectangular piece 28. FIGURE 5 clearly illustrates the respective positions of the aforementioned pole faces.

A cross-shaped means 40 is stamped from mounting frame 17 in such a manner that the longitudinal axis of the cross-shaped means is perpendicular to the longitudinal axis of the mounting frame. A first branch 41 of the cross-shaped means has substantially the same axis as does the axis of node 35 of the armature. It is seen that node 35 is predeterminately spaced from branch 41. Node 35 serves as a seat for one extremity of spiral spring 42. Branch 41 serves as a seat for the other extremity of spiral spring 42. The initial position of node 35 with respect to branch 41 and the length of the spiral spring are such that the spiral spring is retained between the node and the branch of the cross-shaped means under a compressed condition.

The armature 30 is journalled to shaft 43 by means of one-way clutch 34. A full and clear discussion of the components of the clutch and their cooperative relation will be discussed herein later. Suffice it to say that the one-way clutch engages shaft 43 in such a manner so as to rotate the shaft in the clockwise direction as the armature is arcuately displaced.

Aperture 36 is positioned in the flared portion 33 of the armature and has a predetermined radius. Loosely interfitting with the aperture is means 45 utilized for regulating the arcuate displacement of armature 30 which is coupled to shaft 43. The arcuate regulating means of the armature comprises post means 44 securely coupled to the mounting frame in any suitable manner such as press fitting, welding, soldering, or the like, and a sleeve 46 interfitting with the post means. The sleeve is of predetermined radius and is fabricated from any suitable plastic material or the like. FIGURE 5 illustrates the fact that there exists a clearance between the periphery of the sleeve and the aperture 36. It is seen that the amount of clearance between the periphery of the sleeve and the aperture is a factor determinative of extent of the arcuate displacement of the armature. The arcuate displacement of the armature may be varied by merely varying the clearance between the sleeve and the aperture. The less the clearance between the sleeve and the aperture, the greater is the arcuate displacement experienced by the armature, whereas the greater the clearance between the sleeve and the aperture, the greater is the arcuate displacement experienced by the armature.

A C-ring 47 is press fitted on the post means 44 to thereby retain the armature therearound, thus substantially preventing deleterious vertical oscillations the armature may experience from abusive handling.

Second armature 30' is substantially constructed and has substantially the same relationship with coil 23 as does armature 30 except that armature 30' is positioned on the opposite side of coil 23 from the location of armature 30. Armature 30' comprises an arm 31', a plurality of laminations 32', a flared portion 33', a one-way clutch 34', a node 35', and an aperture 36'. The plurality of laminations 32' include a first pole face 37' located juxtaposition field pole face 39' of the laminated core 27. It is seen that pole face 37' is predeterminately spaced from the field pole face 39' as illustrated in FIGURE 5. A second pole face 38' is located juxtaposition a portion of the laminated rectangular-shaped piece 28 as illustrated in FIGURE 5.

As with first armature 30, second armature 30' is located so that the longitudinal axis of the second armature is perpendicular to the axis of the aperture 26 of the spindle. The plurality of laminations 32' are fixedly coupled to the arm by a plurality of securing means such as rivets 29 or the like. The laminations 32' are coupled to each side of the arm and extend the length of flange 24 of the spindle. As laminations 32, laminations 32' are fabricated from any suitable metal such as silicon steel or the like. Laminations 32' provide a low reluctance path for the pulsating magnetic field developed by a pulsating current present in the coil as the coil is energized by a pulsating source (not shown) such as an alternating current source or the like.

A second branch 41' of the cross-shaped means 40 lies in the same plane as does the first branch 41. The second branch has substantially the same axis as does node 35' of armature 30'. As illustrated in FIGURE 5, the second branch is predeterminately spaced from node 35'. Node 35' is a seat for one extremity of spiral spring 42' and branch 41' is a seat for the other extremity of spiral spring 42'. Because of the initial position of node 35' with respect to branch 41' and because of the length of the spiral spring 42', the spiral spring 42' is maintained between the node and the branch of the cross-shaped means under a compressed condition.

Armature 30' is journalled to shaft 43 by means of one-way clutch 34'. One-way clutch 34' operates substantially the same as does one-way clutch 34. A discussion of the operation of one-way clutch 34 would apply equally as well to a discussion of the operation of one-way clutch 34', consequently the discussion of the operation of one-way clutch 34 will suffice for a discussion of the operation of one-way clutch 34'. Such a discussion appears herein later. One-way clutch 34' engages shaft 43 in such a manner so as to rotationally displace the shaft in the clockwise direction as armature 30' is arcuately displaced is the clockwise direction.

Aperture 36' is located in flared portion 33' of the second armature and the aperture has a predetermined radius. Loosely interfitting with aperture is the means for regulating the arcuate displacement of armature 30'. It is seen that the arcuate displacement of armature 30' may be effectively regulated by merely varying the clearance between the sleeve 46 and the aperture 36' as was disclosed in conjunction with the discussion of sleeve 46 and aperture 36 of armature 30. As with armature 30, armature 30' will experience a lesser arcuate displacement the less clearance between the sleeve and aperture 36' whereas the greater the clearance between the sleeve and the aperture 36', the greater is the arcuate displacement experienced by the armature 30'.

As an alternating electrical current is passed through coil 23, an alternating or pulsating magnetic flux is caused to flow through a path defined by armature 30, laminated rectangular piece 28, armature 30', and core 27. The magnetic flux induces or causes a first polarity to exist on the field pole face 39 of the core and a second or opposite polarity to exist on the juxtapositioned pole face 37 of armature 30. Since the polarity existing on the field pole face is opposite of that existing on the pole face, the armature 30 is arcuately displaced toward the core, or counterclockwise direction, thereby further compressing spiral spring 42 so as to store additional energy therein. The extent of the arcuate displacement of armature 30 is determined by the clearance between the periphery of the aperture 36 and the sleeve 46. Maximum arcuate displacement of the armature 30 may be obtained by allowing sufficient clearance between the sleeve and aperture 36 so that armature 30 engages flange 25 prior to any engagement with sleeve 46. The arcuate displacement of the armature is directly proportional to the distance between the armature and the flange or the distance between the aperture and the sleeve, which ever one the armature first engages. As with the relationship between the aperture and the sleeve, the greater the distance between the flange and the armature, the greater is the arcuate displacment of the armature. The less the distance between the flange and the armature, the less is the arcuate displacement of the armature.

Each alternating current one half cycle induces one polarity in field pole face 39 and an opposite polarity in pole face 37. It is seen that if the alternating current is sixty (60) cycles per second, the armature would be attracted to the core 120 times per second. As the magnetic flux begins to collapse on the downslope side of the one-half cycle, the energy stored in spiral spring 42 is sufficient to overcome the residual magnetic flux and deflect the armature away from the coil towards the initial position of the armature, that is, deflect armature 30 in the clockwise direction. In its deflection away from the field pole face, the armature engages shaft 43 thereby deflecting the shaft through a predetermined arc. At the initiation of the next one-half cycle the biasing of the armature by the spring is overcome and the armature is deflected toward pole face 39 due to the existence of opposite polarities on juxtapositioned pole faces, that is, armature 30 is deflected in the counterclockwise direction. Again, the deflection of armature 30 toward field pole face 39 causes spiral spring 42 to be compressed between node 35 and branch 41 thereby storing energy in the further compressed spiral spring. As the armature 30 is displaced toward field pole face 39, the armature is freewheeling of the shaft, that is, the one-way clutch 34 is disengaged from the shaft when the clutch is displaced in the counterclockwise direction.

Armature 30' oscillates about shaft 43 in substantially the same manner as does armature 30. An alternating electric current passed through coil 23 causes an alternating or pulsating magnetic flux to flow in the core of the coil as discussed hereinbefore. A first polarity is induced in pole face 37' of armature 30' and a second or opposite polarity is induced or caused to exist in field pole face 39'. As disclosed hereinbefore, pole face 37' and field pole face 39' are juxtapositioned and in accordance with well known electrical principles opposite polarities attract each other, armature 30' is deflected toward field pole face 39'. Arcuate deflection of armature 30' toward field pole face 39' or the clockwise direction, further compresses spiral spring 42' thereby storing addiitonal energy therein. In its deflection towards the field pole, the armature 30' engages the shaft 43 thereby deflecting the shaft through a predetermined arc. As the magnetic flux begins to collapse on the downslope side of the one half cycle, the energy stored in spiral spring 42' is sufficient to overcome the residual magnetic flux and displace armature 30' away from the coil, or the counterclockwise direction, towards its initial position. As armature 30' is deflected away from the field pole face 39' the armature is freewheeling.

The movement of the respective armatures in opposite directions tends to balance any horizontal displacement forces generated by the movement of either or both armatures. The forces generated by the armatures are thought to be equal and opposite thereby cancelling each other.

It is seen from the foregoing disclosure, that armature 30 and armature 30' oscillate about the axis of shaft 43, that is, the axis of shaft 43 is the pivot point of each of the armatures. Brackets 48 are positioned with relation to the coil and the armatures so as to retain the armature and the laminated rectangular piece at predetermined positions with respect to the coil.

Shaft 43 has fixedly coupled to one extremity thereof pinion 20. Shaft 43 is journalled to mounting frame 17 by bearing means 49. Mounting frame 17 includes an aperture 50 in which the spindle and its associated flanges and the coil are seated to provide a secure mounting means that substantially prevents horizontal movement by the coil and the spindle. A cover 51 substantially interfitting with electric motor in three planes encloses the motor in those three planes thereby protecting the motor from abusive handling. In addition, cover 51 substantially prevents vertical displacement of coil 23. Cover 51 is fixedly coupled to the mounting frame by a plurality of appropriate securing means such as rivets 29 and securing tabs 52.

As disclosed hereinbefore armature 30 is coupled to shaft 43 by means of one-way clutch 34. One-way clutch is designed and fabricated so as to be free to rotate in the counter-clockwise direction about shaft 43. The one-way clutch will lock or engage with the shaft when the one-way clutch is displaced in the clockwise direction. Shaft 43 is engaged with or locked to one-way clutch 34 when the shaft is rotated in the counter-clockwise direction whereas the shaft is disengaged or free to rotate within the one-way clutch when the shaft is rotated in the clockwise direction. It is seen when armature 30 is arcuately displaced in the clockwise direction, one-way clutch 34 is engaged with or locked to the shaft in a manner to be disclosed hereinafter thereby displacing shaft 18 through an arc proportional to the displacement of armature 30. The suggested arcuate displacement of the armature is 15 minutes. The arcuate displacement of the armature can be effectively controlled by varying the thickness of the sleeve 46 in the manner disclosed hereinbefore. When armature 30 is displaced in the counterclockwise direction upon the collapse of the magnetic flux and the release of energy stored in spring 42, the armature is arcuately displaced in the counterclockwise direction without arcuately displacing shaft 43 for clutch 34 does not engage with or lock to the shaft when displaced in the counterclockwise direction. It is seen that the above mentioned cycle is continuous as long as an alternating current is applied to coil 10.

A second one-way clutch 34' fabricated and constructed substantially similar to one-way clutch 34 couples armature 30' to shaft 43. One-way clutch 34' like one-way clutch 34 is free wheeling with respect to shaft 43 when displaced in the counterclockwise direction and engaged with or locked to shaft 43 when the clutch is displaced in the clockwise direction. Shaft 43 will lock with one-way clutch 34' as the shaft is rotationally displaced in the counterclockwise direction. One-way clutch 34' will engage or lock with shaft 43 when the one-way clutch is arcuately displaced in the clockwise direction thereby arcuately displacing the shaft in the clockwise direction.

Figure 6:
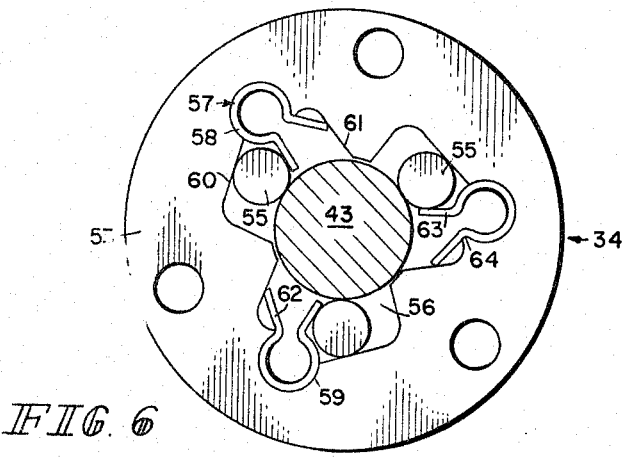
FIGURE 6 is an enlarged top view illustrating in detail novel arrangement of the one-way clutch about the periphery of a shaft.

FIGURE 6 illustrates the construction of one-way clutch 34. It is emphasized that the description of one-way clutch 34 pertains with equal pertinence to the construction of one-way clutch 34'. Since the one-way clutches are the same and in the interest of a clearer showing of the inventive portion of the one-way clutch, FIGURE 6 serves to illustrate the construction of both of the clutches.

Specifically referring to FIGURE 6, one-way clutch 34 is engaged with ring 53 when shaft 43 is rotatably displaced in the counterclockwise direction. Ring 53 is fixedly coupled to armature by the combination of retaining cap 54 and any suitable securing means such as rivets 29. As one-way clutch 34 is displaced in the clockwise direction, the shaft engages ring 53 due to the presence of a coefficient of friction that exists between the portion of the surface of the shaft that engages a portion of each of a plurality of roller bearings 55, and due to the presence of a coefficient of friction existing between a second of the plurality of roller bearings and a portion of the surface of the ring that engages the second portion of each of the roller bearings. Ring 35 and the plurality of roller bearings are fabricated from any suitable steel of desired hardness such that wear particles of steel that might occur cannot subsequently become magnetized thereby possibly adhering to either the ring, the roller bearings or the shaft. It is seen that such adherence of wear particles would deleteriously effect the accurate engaging and disengaging characteristics of the one-way clutch. If shaft 43 is chromium plated, no lubrication need be used to lubricate areas of contact between the shaft and the roller bearings; however, if the shaft is not chromium plated, it is suggested that a suitable lubricant be utilized to thereby protect the roller bearings and the shaft from excessive wear.

Shaft 43 projects through recess portion 56 of the one-way clutch. As illustrated in FIGURE 6, the recess portion has a novel configuration which is utilized to seat the plurality of odd number of bearings about the shaft. In addition, the recess portion is used to seat at least one resilient spring 57 in such a manner that the spring is cooperatively associated with each of the bearings. Each of the springs has a general configuration of being V-shaped with the exception of the crotch portion 58 thereof which is substantially three-quarter circular shaped so as to interfit with substantially three-quarter circular first portion 59 of the recessed portion. The springs 57 bias their respective roller bearings into engagement with the shaft and with the corresponding recess faces 60. As illustrated in FIGURE 6, rotational displacement of the ring in the clockwise direction provides a means and a method whereby spring 57 forces roller bearings 55 into engagement with the recess face so that the bearing locks with the shaft thereby locking the ring to the shaft. Continued rotational displacement of the ring in the clockwise direction drives the shaft and the pinion in the clockwise direction.

A second portion 61 is substantailly parallel to a line drawn so as to bisect a front view of a substantially V-shaped resilient spring. A leg 62 of the substantially V-shaped spring is positioned so as to engage second portion 61 when ring 53 is displaced in the clockwise direction. Second portion 61 through leg 62 maintains leg 63 at a predetermined position with respect to the roller bearing. A flange 64 of the recess portion 56 is formed at the point where the first portion 59 and the second portion 61 join so as to provide a pivot point for the resilient spring as the spring is compressed or expanded due to the displacement of the cooperatively associated bearing.

Leg 63 urges the cooperatively associated bearing to a predetermined position with respect to shaft 43 and with respect to recessed face 60. At the predetermined position the bearing is required to traverse an arcuate distance of less than four minutes of a degree to either permit shaft 43 to be free wheeling or to lock the shaft to the ring. It is suggested that the springs be fabricated from beryllium copper in order that the respective springs will not magnetize. It is seen that if the springs did subsequently become magnetized, the springs would accumulate metallic particles and such an accumulation would either cause the bearings to skid before engaging shaft 43 or to remain engaged with the shaft for a greater arcuate displacement than can be tolerated or both.

As disclosed hereinbefore the three-quarter circular first portion 59 terminates in a channel or recessed face 60. The recessed face possesses an engagement angle that is progressively larger with respect to a cord of shaft 43 drawn between the point of the shaft where the shaft is free-wheeling of the bearing and the point on the shaft where the shaft is engaged with the ring through the bearing. The engagement angle is equal to the angle of the cord plus approximately eight to ten degrees. It was found that if the engagement angle exceeds the angle of the cord plus ten degrees, the bearings have a tendency to skid on the periphery of the shaft before locking therewith, thereby altering the engaging or locking accuracy of the clutch. It was found that if the engagement angle is less than the angle of the cord plus eight degrees, the roller bearings lag in disengaging the periphery of the shaft thereby altering the accuracy of disengagement of the clutch with the shaft. The length of the recessed face is approximately one and one-half times the diameter of the cooperatively associated roller bearing so as to provide a face of ample length to thereby compensate for possible wear that may occur on either the bearing or the recessed faces or both.

As disclosed hereinbefore, an odd number of equally spaced bearings are placed about the shaft in ring 53 thereby allowing the shaft to have a self-centering characteristic. The self-centering characteristic of the shaft substantially eliminates excessive bearing wear caused by shaft oscillation, and the tendency of the shaft to skid on the bearings if the shaft is not centered between the bearings thereby promoting longer bearing and shaft life. It was found that if an even number of equally spaced bearings were utilized in ring 53, the bearings and the shaft experienced excessive wear. For example, if shaft 43 is displaced toward a first one of the bearings, a second bearing opposite of and having its center lying in a plane passing through the longitudinal axis of the shaft and the center the first bearing would not be urged toward the shaft but would be urged in the counterclockwise direction by spring 57 due to the inherent contour of the spring and the contour of the recessed face. Since the second bearing no longer carries its proportional share of the load, the weight of the load is shifted to the remaining bearings thereby appreciably increasing the wear of the bearings functioning under an increased load. It is seen that no bearing support is provided the shaft at the point of separation between the shaft and the second bearing. The result is that the shaft may oscillate within the unsupported area thereby having a deleterious effect on the accuracy of operation of the one-way clutch. However, if an odd number of equally spaced bearings are utilized when shaft 43 is displaced toward one of the bearings, leg 63 urges the bearing into such a position with respect to the recessed face and the shaft that the shaft cannot oscillate. The load carried by the bearings remains equally distributed. The characteristics of the one-way clutch are not effected nor do any of the bearings experience excessive wear.

Figure 3:
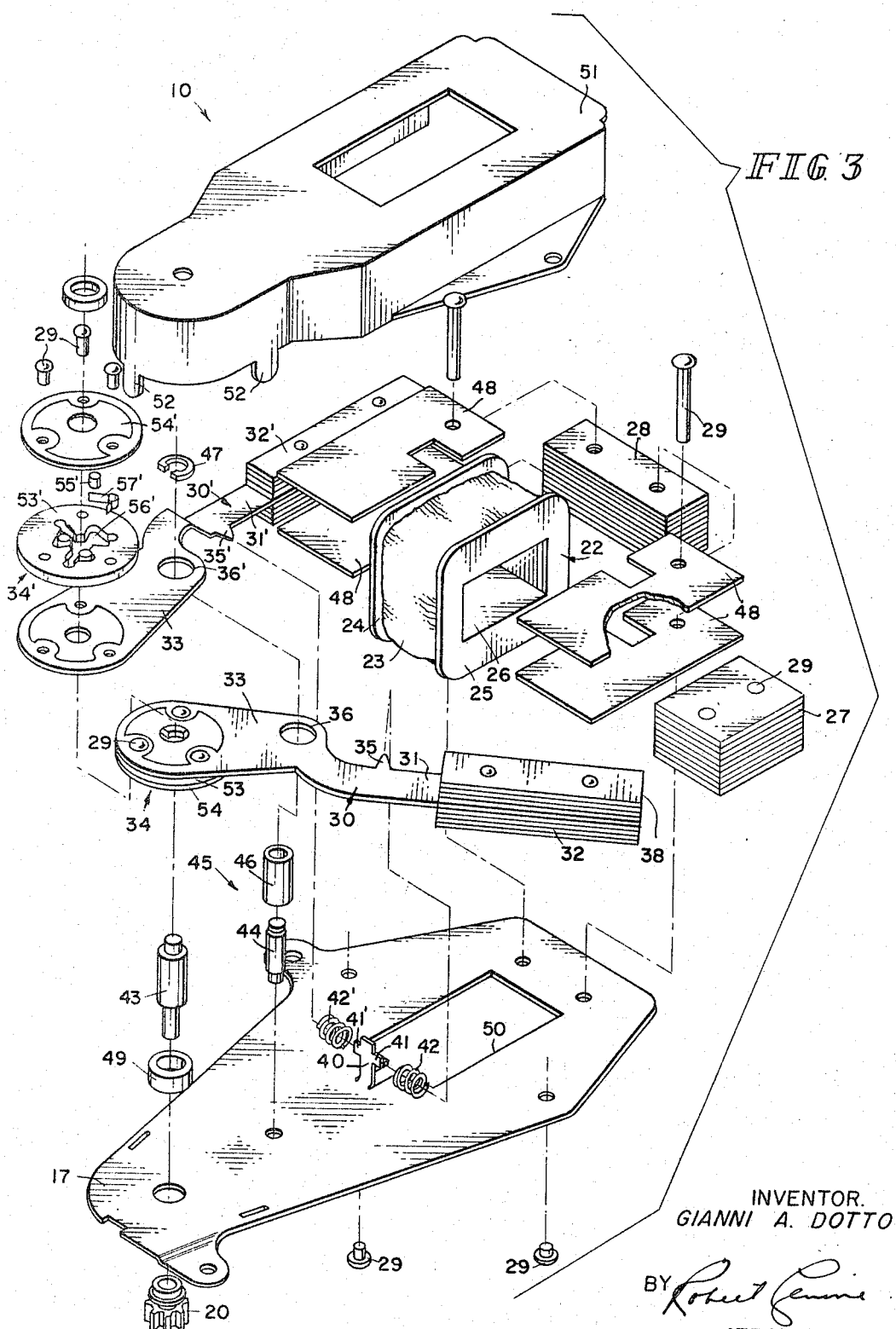
FIGURE 3 is a perspective view illustrating in detail the component parts of the prime mover means.
Figure 4:
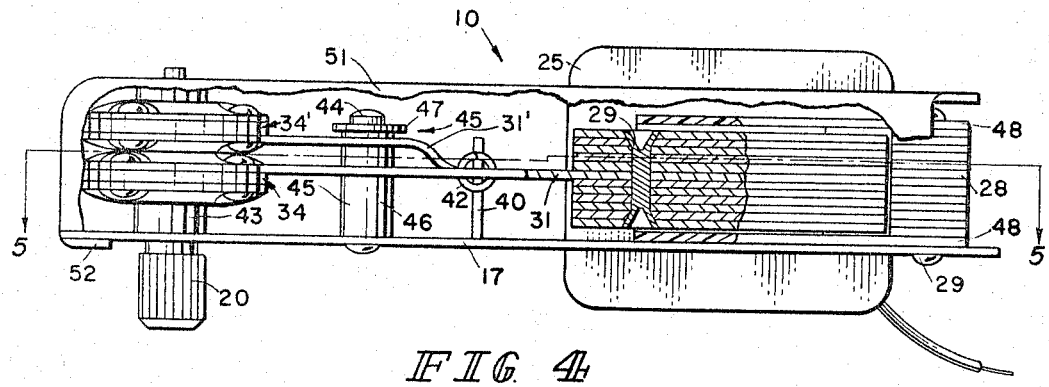
FIGURE 4 is a fragmentary cross sectional view of the prime mover means illustrating the laminations of an armature and the coupling of the balanced armatures to a drive shaft by means of a plurality of one-way clutches.

FIGURE 3 illustrates the various component parts of one-way clutch 34'. It is seen that these component parts correspond in function and relationship to the component parts of one-way clutch 34. Accordingly, the component parts of one-way clutch 34' corresponding to the sister component parts of one-way clutch 34 have been designated with prime number to thereby indicate similarity in function and relationship.

Figure 7:
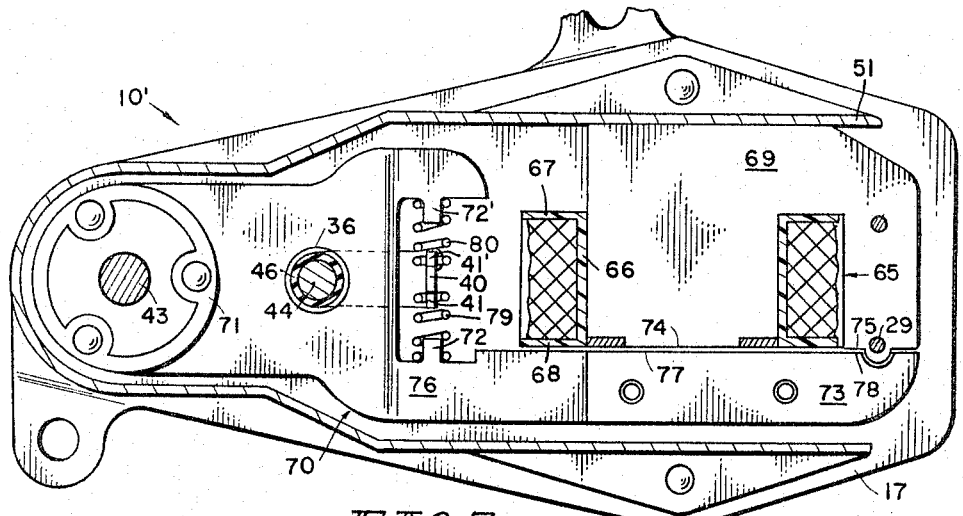
FIGURE 7 is a top view of an embodiment of the present invention taken across the lines 7—7 of FIGURE 8 illustrating the use of a balanced single armature.
Figure 8:
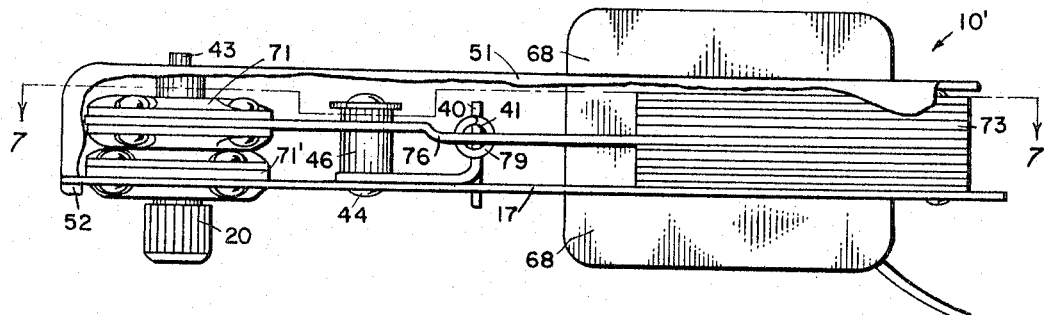
FIGURE 8 is a fragmentary side of the embodiment of FIGURE 7 illustrating the position of the armature and the one-way clutches with respect to the drive shaft.

FIGURES 7 and 8 show an embodiment of the electric motor and illustrate features not found elsewhere in the drawings. In this embodiment of the present invention, the electric motor is equipped with a single, balanced armature that rotatably displaces shaft 43 unidirectionally with a rotary motion.

Coil 65 is wound about spindle 66 in any conventional manner. Spindle 66 is fabricated from any suitable insulative material such as plastic or the like. Spindle 66 has a first flange 67 and a second flange 68 similar to the first and second flanges of spindle 22 of coil 23. The spindle 66 serves to locate the coil 65 within an aperture (not shown) of the mounting frame 17. An aperture traverses the longitudinal axis of the spindle and projects through flanges 67 and 68. A plurality of substantially C-shaped laminations 69 have one leg thereof that interfits with the aperture of the spindle and another leg thereof that interfits with a portion of the coil 65 as illustrated in FIGURE 7. The C-shaped laminations are fabricated from any suitable metal such as silicon steel or the like and provide a low reluctance path for the pulsating magnetic flux developed by a pulsating or alternating current present within coil 65. The C-shaped laminations are retained in place by a plurality of securing means such as rivets 29 that are press fitted or welded to the mounting frame.

An armature 70 includes a one-way clutch 71, nodes 72 and 72', and a plurality of laminations 73. Laminations 73 are fixedly coupled to armature 70 so that the laminations are juxtaposition the field pole faces 74 and 75 of the C-shaped laminations. FIGURE 7 illustrates that the laminations 73 extend a predetermined length along arm 76 of the armature. A pole face 77 of laminations 73 is located opposite field pole face 74 and a pole face 78 is located opposite field pole face 75. It is seen that the magnetic flux will travel the low reluctance path determined by the C-shaped laminations 69 and the laminations 73. In accordance with well known magnetic principles, field pole face 74 will have an induced polarity opposite the induced polarity of pole face 77 and field pole face 75 will have an induced polarity opposite the induced polarity of pole face 78. It is known that opposite polarities attract, as discussed hereinbefore, and accordingly, armature 70 is arcuately displaced toward the field poles of the C-shaped laminations. The attraction of the balanced armature toward the C-shaped laminations occurs every one half cycle in the manner described in conjunction with the discussion of FIGURES 1–5.

A cross-shaped means 40 has oppositely extending branches 41 and 41' as disclosed hereinbefore. Branch 41 is located opposite from and predeterminately spaced from node 72 of armature 70. Branch 41' is located opposite from and predeterminately spaced from node 72' of the armature. A spiral spring 79 is retained between node 72 and branch 41 in a compressed fashion and spiral spring 80 is retained between node 72' and branch 41' in a compressed fashion. It is seen that arcuate displacement of the armature toward the C-shaped laminations would further compress spring 79 thereby storing additional energy therein and at the same time release a portion of the energy already stored in spring 80. Upon the collapse of the magnetic flux at the commencement of the downslope of the alternating current cycle, the additional energy stored in spring 79 is released and armature 70 returns to its initial position. The use of dual springs positioned as illustrated in FIGURE 7 and as described hereinbefore serves to balance the armature thereby subjecting the electric motor to less vibration, the vibration generated by the oscillating armature. The arcuate displacement of the armature may be controlled in the same manner as disclosed in the discussion of FIGURES 1–5. The novel means and method includes a post means 44 and a sleeve 46 which project through aperture 36 of armature 70. As indicated hereinbefore, the r.p.m. of the shaft may be effectively regulated by regulating the arcuate displacement of armature 70. This is done by placing a sleeve of determined radius over the post means to either minimize the gap between the sleeve and aperture 36 to reduce the r.p.m. of the shaft or to maximize the r.p.m. of the shaft by placing a sleeve of minimum radius over the post means. It is seen that the arcuate displacement of armature 70 is directly effected as was the arcuate displacement of armature 30.

One-way clutches 71 and 71' are structurally similar to and the components thereof are cooperatively associated like the one-way clutch illustrated in FIGURE 6. One-way clutch 71 is coupled to shaft 43 in such a manner that the clutch is free-wheeling in the counterclockwise direction and engaged with or locked to the shaft when the one-way clutch is displaced in the clockwise direction. Shaft 43 is locked to one-way clutch 71 when the shaft is rotatably displaced in the counterclockwise direction; however, the shaft is free to rotate within the one-way clutch when the shaft is rotatably displaced in the clockwise direction. It is seen that as armature 70 is arcuately displaced in the clockwise direction, the armature is locked with the shaft by means of one-way clutch 71 thereby arcuately displacing shaft 43 in proportion to the arcuate displacement of the armature. As the magnetic flux is collapsing and in accordance with the principles discussed hereinbefore, the energy stored in the springs is released thereby returning the armature 70 to its initial position with respect to the coil. It is seen that the aforementioned cycle is continuous for as long as an alternating current is applied to coil 65.

One-way clutch 71' is fixedly mounted in mounting frame 17 and positioned about shaft 43. One-way clutch 71' locks shaft 43 thereto as the shaft is urged in the counterclockwise direction. One-way clutch 71' will prevent arcuate displacement of the shaft in the counterclockwise direction as the one-way clutch 71 of armature 70 is arcuately displaced in the counterclockwise direction. It is seen that the shaft is displaced in the clockwise direction only and any tendency of any frictional forces action to arcuately displace the shaft in the counterclockwise direction are overcome by the prohibiting action of the one-way clutch 71'. One-way clutch 71' allows the shaft to be free-wheeling in the clockwise direction.

Cover 51 securely coupled to mounting frame 17 by any suitable securing means such as tabs, rivets, or the like effectively cooperate to thereby encapsulate the electric motor. The protective encapsulation protects the motor from abusive handling and from deleterious particles present in the air.

Figure 9:
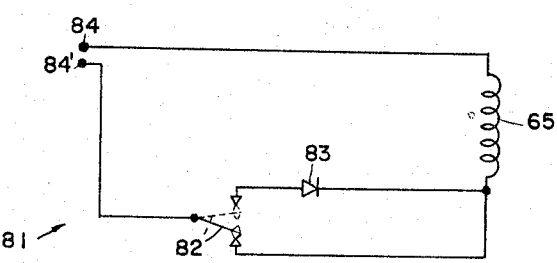
FIGURE 9 is an electrical schematic illustrating a speed regulating means for varying the speed of the shaft of the prime mover.
Figure 10:
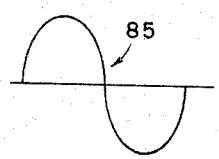
FIGURE 10 illustrates the full wave of an alternating current cycle applied to the coil of the prime mover when a diode of the speed regulating means is not electrically coupled to the prime mover.
Figure 11:
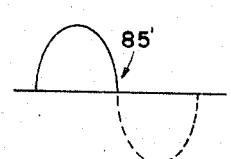
FIGURE 11 illustrates the half wave of an alternating current cycle applied to the coil of the prime mover when the diode is electrically coupled to the prime mover.

FIGURE 9 illustrates a speed regulating means 81 comprising a switch means 82 and a diode 83. The switch means provides a means whereby the diode 83 is either coupled in series with the coil of the electric motor or whereby the coil of the electric motor is coupled directly across terminals 84 and 84' by any suitable electrically conductive coupling means such as, copper wire or the like. Terminals 84 and 84' are coupled across any suitable alternating current source. The solid line position of switch 82 shows the coil coupled directly across the alternating current source thereby allowing the full cycle to be across the coil. Under this condition each armature oscillates 120 times per second assuming the source generates a 60 cycle per second alternating current wave. If the switch is actuated to the dotted line position illustrated in FIGURE 9, the diode 83 is connected in series with the coil of the alternating current motor. The diode "clips off" the negative one-half cycle of the alternating current wave thereby reducing the armature oscillation to 60 times per minute assuming the source generates a 60 cycle per second alternating current wave. It is seen that by the use of the speed regulating means illustrated in FIGURE 9, the speed of the electric motor can be effectively regulated.

While the invention is illustrated and described in its preferred embodiments, it will be understood that modifications and variations may be made without departing from the scope of the novel concepts of this invention and set forth in the appended claims.

Having thus described my invention, I claim:

1. An electric motor including the characteristics of low, constant speed and high torque comprising: an output shaft; a coil including electrical connections for applying a current to said coil; a magnetic flux developed by said current passing through said coil; a laminated core for providing a plurality of field pole faces; a rectangular piece juxtaposition said coil providing a low reluctance path for said magnetic flux; a plurality of lamination-carrying armatures juxtaposition said core and said coil, said laminations providing pole faces positioned opposite said field pole faces, interaction between said magnetic flux of said coil and said armatures causes said armatures to oscillate; and a plurality of one-way clutches coupling said armatures to said shaft, said one-way clutches translating said oscillatory motion of said armatures to a unidirectional constant motion, said motion arcuately displacing said shaft in a predetermined direction at a constant speed.

2. An electric motor including the characteristics of low, constant speed and high torque comprising: an output shaft; a coil including electrical connections for applying an alternating current to said coil; a pulsating magnetic flux developed by said alternating current passing through said coil; a laminated core for providing a plurality of field pole faces and a low reluctance path for said magnetic flux, said laminated core positioned within said aperture of said coil; a rectangular piece juxtaposition said coil providing a low reluctance path for said magnetic flux; a plurality of lamination-carrying armatures juxtaposition said core and said coil, said laminations providing pole faces positioned opposite said field pole faces and a low reluctance path for said magnetic flux, interaction between said pulsating magnetic flux of said coil and said armatures causes said armatures to oscillate; and a plurality of one-way clutches coupling said armatures to said shaft, said one-way clutches translating said oscillatory motion of said armatures to a unidirectional constant motion, said motion arcuately displacing said shaft in a predetermined direction at a constant speed.

3. An electric motor including the characteristics of low, constant speed and high torque comprising: an output shaft; a coil including electrical connections for applying an alternating current to said coil; a pulsating magnetic flux developed by said alternating current passing through said coil; a laminated core for providing a plurality of field pole faces and a low reluctance path for said magnetic flux, said laminated core positioned within said aperture of said coil; a rectangular piece juxtaposition said coil providing a low reluctance path for said magnetic flux; a plurality of lamination-carrying armatures juxtaposition said core and said coil, said laminations providing pole faces positioned opposite said field pole faces and a low reluctance path for said magnetic flux, interaction between said pulsating magnetic flux of said coil and said armatures causes said armatures to oscillate; and a plurality of one-way clutches coupling said armatures to said shaft, each of said clutches including an odd number of roller bearings, a resilient spring cooperatively associated with each of said roller bearings for urging said bearings to a predetermined position, and a seat for said roller bearings wherein said seat includes an engagement angle for permitting said bearings to be free wheeling in one direction with respect to said shaft and locked to said shaft in a second direction, said one-way clutches translating said oscillatory motion of said armatures to a unidirectional constant motion, said motion arcuately displacing said shaft in a predetermined direction at a constant speed.

4. An electric motor including the characteristics of low, constant speed and high torque comprising: an output shaft; a coil including electrical connections for applying an alternating current to said coil; a pulsating magnetic flux developed by said alternating current passing through said coil; a laminated core for providing a plurality of field pole faces and a low reluctance path for said magnetic flux, said laminated core positioned within said aperture of said coil; a rectangular piece juxtaposition said coil providing a low reluctance path for said magnetic flux; a plurality of lamination carrying armatures juxtaposition said core and said coil, said laminations providing pole faces positioned opposite said field pole faces and a low reluctance path for said magnetic flux, interaction between said pulsating magnetic flux of said coil and said armatures causes said armatures to oscillate; and a plurality of one-way clutches coupling said armatures to said shaft, said one-way clutches translating said oscillatory motion of said armatures to a unidirectional constant motion, said motion arcuately displacing said shaft in a predetermined direction at a constant speed; and a speed regulating means for varying the speed of said shaft, said speed regulating means including a switch means for electrically connecting a diode in series with said coil, said diode eliminating one half of said alternating current cycle thereby reducing said speed of said shaft.

5. A two speed electric motor comprising: an output shaft; a coil including electrical connections for applying an alternating current to said coil; a pulsating magnetic flux developed by said alternating current passing through said coil; a C-shaped laminated means including a leg thereof interfitting with an aperture of said coil, said C-shaped laminations providing a plurality of field pole faces and a low reluctance path for said magnetic flux; a lamination carrying armature including pole faces cooperatively associated with said field pole faces of said C-shaped laminated means such that attraction occurs between said pole faces and said field pole faces due to said magnetic flux of said coil causing said armature to deflect in a first direction storing energy in said armature, cessation of said flux causes said armature to release its stored energy and thereby return to its initial position; a one-way clutch connected to said armature and to said shaft providing a pivot point for said armature about said shaft, said clutch translating said arcuate motion of said armature to a unidirectional motion, said unidirectional motion arcuately displacing said shaft in a predetermined direction; means including a post means, a sleeve means interfitting with said post means and an aperture in said armature loosely interfitting with said post means and said sleeve means, said means regulating said arcuate motion of said armature; and a speed regulating means for varying the speed of said shaft.

6. A two speed electric motor comprising: an output shaft; a coil including electrical connections for applying an alternating current to said coil; a pulsating magnetic flux developed by said alternating current passing through said coil; a C-shaped laminated means including a leg thereof interfitting with an aperture of said coil, said C-shaped laminations providing a plurality of field pole faces and a low reluctance path for said magnetic flux; a lamination carrying armature including pole faces cooperatively associated with said field pole faces of said C-shaped laminated means such that attraction occurs between said pole faces and said field pole faces due to said magnetic flux of said coil causing said armature to deflect in a first direction storing energy in said armature, cessation of said flux causes said armature to release its stored energy and thereby return to its initial position; a one-way clutch connected to said armature and to said shaft providing a pivot point for said armature about said shaft, said clutch including an odd number of roller bearings, a resilient spring cooperatively associated with each of said roller bearings for urging said bearings to a predetermined position, and a seat for said roller bearings wherein said seat includes an engagement angle for permitting said bearings to be free wheeling in one direction with respect to said shaft and locked to said shaft in a second direction, said clutch translating said arcuate motion of said armature to a unidirectional motion, said unidirectional motion arcuately displacing said shaft in a predetermined direction; means including a post means, a sleeve means interfitting with said post means and an aperture in said armature loosely interfitting with said post means and said sleeve means, said means regulating said arcuate motion of said armature; and a speed regulating means for varying the speed of said shaft.

7. A two speed electric motor comprising: an output shaft; a coil including electrical connections for applying an alternating current to said coil; a pulsating magnetic flux developed by said alternating current passing through said coil; a C-shaped laminated means including a leg thereof interfitting with an aperture of said coil, said C-shaped laminations providing a plurality of field pole faces; a lamination carrying armature including pole faces cooperatively associated with said field pole faces of said C-shaped laminated means such that attraction occurs between said pole faces and said field pole faces due to said magnetic flux of said coil causing said armature to deflect in a first direction storing energy in said armature, cessation of said flux causes said armature to release its stored energy and thereby return to its initial position; a one-way clutch connected to said armature and to said shaft providing a pivot point for said armature about said shaft, said clutch translating said arcuate motion of said armature to a unidirectional motion, said unidirectional motion arcuately displacing said shaft in a predetermined direction; means including a post means, a sleeve means interfitting with said post means and an aperture in said armature loosely interfitting with said post means and said sleeve means, said means regulating said arcuate motion of said armature; and a speed regulating means for varying the speed of said shaft, said speed regulating means including a switch means for electrically connecting a diode in series with said coil, said diode eliminating one half of said alternating current cycle thereby reducing said speed of said shaft.

8. An electric motor comprising: an output shaft; a coil including electrical connections for applying current to said coil; a magnetic flux developed by said current passing through said coil; a core for providing a plurality of field pole faces; a rectangular piece juxtaposition said coil providing a low reluctance path for said magnetic flux; a plurality of lamination carrying armatures juxtaposition said core and said coil, said laminations providing pole faces positioned opposite said field pole faces, attraction occurring between said pole faces and said field pole faces due to said magnetic flux of said coil causing one of said armatures to deflect in a first direction and another of said armatures to deflect in a second direction, said deflection of said armatures causes said armatures to store energy, cessation of said flux causes said armatures to release said stored energy and return to their initial positions; a plurality of one-way clutches coupling said armatures to said shaft thereby providing a pivot point for said armatures about said shaft, said one-way clutches translating said arcuate displacement of said armatures to a unidirectional constant motion, said motion arcuately displacing said shaft in a predetermined direction at a constant speed; means for regulating said arcuate displacement of said armature; and a speed regulating means for varying the speed of said shaft.

9. An electric motor comprising: an output shaft; a coil including electrical connections for applying an alternating current to said coil; a pulsating magnetic flux developed by said alternating current passing through said coil; a laminated core for providing a plurality of field pole faces, said laminated core positioned within said aperture of said coil; a rectangular piece juxtaposition said coil providing a low reluctance path for said magnetic flux; a plurality of lamination carrying armatures juxtaposition said core and said coil, said laminations providing pole faces positioned opposite said field pole faces, attraction occurring between said pole faces and said field pole faces due to said magnetic flux of said coil causing one of said armatures to deflect in a first direction and another of said armatures to deflect in a second direction, said deflection of said armatures causes said armatures to store energy, cessation of said flux causes said armatures to release said stored energy and return to their initial positions; a plurality of one-way clutches coupling said armatures to said shaft thereby providing a pivot point for said armatures about said shaft, said one-way clutches translating said arcuate displacement of said armatures to a unidirectional constant motion, said motion arcuately displacing said shaft in a predetermined direction at a constant speed; means for regulating said arcuate displacement of said armature; and a speed regulating means for varying the speed of said shaft.

10. An electric motor comprising: an output shaft; a coil including electrical connections for applying an alternating current to said coil; a pulsating magnetic flux developed by said alternating current passing through said coil; a laminated core for providing a plurality of field pole faces, said laminated core positioned within said aperture of said coil; a rectangular piece juxtaposition said coil providing a low reluctance path for said magnetic flux; a plurality of lamination carrying armatures juxtaposition said core and said coil, said laminations providing pole faces positioned opposite said field pole faces, attraction occurring between said pole faces and said field pole faces due to said magnetic flux of said coil causing one of said armatures to deflect in a first direction and another of said armatures to deflect in a second direction, said deflection of said armatures causes said armatures to store energy, cessation of said flux causes said armatures to release said stored energy and return to their initial positions; a plurality of one-way clutches coupling said armatures to said shaft thereby providing a pivot point for said armatures about said shaft, said one-way clutches translating said arcuate displacement of said armatures to a unidirectional constant motion, said motion arcuately displacing said shaft in a predetermined direction at a constant speed; means including a post means, a sleeve means interfitting with said post means and an aperture in each of said armatures loosely interfitting with said post means and said sleeve means, said means regulating said arcuate displacement of said armature; and a speed regulating means for varying the speed of said shaft.

11. An electric motor comprising: an output shaft; a coil including electrical connections for applying an alternating current to said coil; a pulsating magnetic flux developed by said alternating current passing through said coil; a laminated core for providing a plurality of field pole faces, said laminated core positioned within said aperture of said coil; a rectangular piece juxtaposition said coil providing a low reluctance path for said magnetic flux; a plurality of lamination carrying armatures juxtaposition said core and said coil, said laminations providing pole faces positioned opposite said field pole faces, attraction occurring between said pole faces and said field pole faces due to said magnetic flux of said coil causing one of said armatures to deflect in a first direction and another of said armatures to deflect in a second direction, said deflection of said armatures causes said armatures to store energy, cessation of said flux causes said armatures to release said stored energy and return to their initial positions; a plurality of one-way clutches coupling said armatures to said shaft thereby providing a pivot point for said armatures about said shaft, said clutch including an odd number of roller bearings, a resilient spring cooperatively associated with each of said roller bearings for urging said bearings to a predetermined position, and a seat for said roller bearings wherein said seat includes an engagement angle for permitting said bearings to be free wheeling in one direction with respect to said shaft and locked with said shaft in a second direction, said one-way clutches translating said arcuate displacement of said armatures to a unidirectional constant motion, said motion arcuately displacing said shaft in a predetermined direction at a constant speed; means including a post means, a sleeve means interfitting with said post means and an aperture in each of said armatures loosely interfitting with said post means and said sleeve means, said means regulating said arcuate displacement of said armature; and a speed regulating means for varying the speed of said shaft.

12. An electric motor comprising: an output shaft; a coil including electrical connections for applying an alternating current to said coil; a pulsating magnetic flux developed by said alternating current passing through said coil; a laminated core for providing a plurality of field pole faces, said laminated core positioned within said aperture of said coil; a rectangular piece juxtaposition said coil providing a low reluctance path for said magnetic flux; a plurality of lamination carrying armatures juxtaposition said core and said coil, said laminations providing pole faces positioned opposite said field pole faces, attraction occurring between said pole faces and said field pole faces due to said magnetic flux of said coil causing one of said armatures to deflect in a first direction and another of said armatures to deflect in a second direction, said deflection of said armatures causes said armatures to store energy, cessation of said flux causes said armatures to release said stored energy and return to their initial positions; a plurality of one-way clutches coupling said armatures to said shaft thereby providing a pivot point for said armatures about said shaft, said one-way clutches translating said arcuate displacement of said armatures to a unidirectional constant motion, said motion arcuately displacing said shaft in a predetermined direction at a constant speed; means including a post means, a sleeve means interfitting with said post means and an aperture in each of said armatures loosely interfitting with said post means and said sleeve means, said means regulating said arcuate displacement of said armature; and a speed regulating means for varying the speed of said shaft, said speed regulating means including a switch means for electrically coupling a diode in series with said coil, said diode eliminating one half of said alternating current cycle thereby reducing said speed of said shaft.

13. An electric motor comprising: an output shaft; a coil including electrical connections for applying current to said coil; a magnetic flux developed by said current passing through said coil; core means interfitting with an aperture of said coil, and providing a plurality of field pole faces; an armature having pole faces cooperatively associated with said coil such that attraction occurs between said pole faces and said field pole faces due to said magnetic flux of said coil causing said armature to deflect in a first direction storing energy in said armature, cessation of said flux causing said armature to release its stored energy and thereby returning to its initial position; a one-way clutch connected to said armature and to said shaft translating said motion of said armature to a unidirectional motion, said unidirectional motion displacing said shaft in a predetermined direction; and means loosely interfitting with an aperture in said armature regulating said deflection of said armature.

14. An electric motor comprising: an output shaft; a coil including electrical connections for applying current to said coil; a magnetic flux developed by said current passing through said coil; core means interfitting with an aperture of said coil and providing a plurality of field pole faces; an armature including pole faces cooperatively associated with said coil such that attraction occurs between said pole faces and said field pole faces due to said magnetic flux of said coil causing said armature to deflect in a first direction; bias means connected to said armature storing energy as said armature is deflected, cessation of said flux causing said bias means to release its stored energy returning said armature to its initial position; a one-way clutch connected to said armature and to said shaft translating said motion of said armature to a unidirectional motion, said unidirectional motion displacing said shaft in a predetermined direction; and means including a post means, a sleeve means interfitting with said post means and an aperture in said armature loosely interfitting with said post means and said sleeve means, said means regulating said deflection of said armature.

15. An electric motor comprising: an output shaft; a coil including electrical connections for applying an alternating current to said coil; a pulsating magnetic flux developed by said alternating current passing through said coil; core means interfitting with an aperture of said coil providing a plurality of field pole faces and a low reluctance path for said magnetic flux; an armature including pole faces cooperatively associated with said coil such that attraction occurs between said pole faces and said field pole faces due to said magnetic flux of said coil causing said armature to deflect in a first direction; spring bias means connected to said armature storing energy as said armature is deflected, cessation of said flux causing said bias means to release its stored energy returning said armature to its initial position; a one-way clutch connected to said armature and to said shaft translating said motion of said armature to a unidirectional motion, said unidirectional motion displacing said shaft in a predetermined direction; and means including a post means, a sleeve means interfitting with said post means and an aperture in said armature loosely interfitting with said post means and said sleeve means, said means regulating said deflection of said armature.

16. A two-speed electric motor comprising: an output shaft; a coil including electrical connections for applying an alternating current to said coil; a pulsating magnetic flux developed by said alternating current passing through said coil; core means interfitting with an aperture of said coil providing a plurality of field pole faces and a low reluctance path for said magnetic flux; an armature including pole faces cooperatively associated with said coil such that attraction occurs between said pole faces and said field pole faces due to said magnetic flux of said coil causing said armature to deflect in a first direction; spring bias means connected to said armature storing energy as said armature is deflected, cessation of said flux causing said bias means to release its stored energy returning said armature to its initial position; a one-way clutch connected to said armature and to said shaft translating said motion of said armature to a unidirectional motion, said unidirectional motion displacing said shaft in a predetermined direction; and means including a post means, a sleeve means interfitting with said post means and an aperture in said armature loosely interfitting with said post means and said sleeve means, said means regulating said deflection of said armature; and a speed regulating means for varying the speed of said shaft.

17. A two-speed electric motor comprising: an output shaft; a coil including electrical connections for applying an alternating current to said coil; a pulsating magnetic flux developed by said alternating current passing through said coil; core means interfitting with an aperture of said coil providing a plurality of field pole faces and a low reluctance path for said magnetic flux; an armature including pole faces cooperatively associated with said coil such that attraction occurs between said pole faces and said field pole faces due to said magnetic flux of said coil causing said armature to deflect in a first direction; spring bias means connected to said armature storing energy as said armature is deflected, cessation of said flux causing said bias means to release its stored energy returning said armature to its initial position; a one-way clutch connected to said armature and to said shaft translating said motion of said armature to a unidirectional motion, said unidirectional motion displacing said shaft in a predetermined direction; and means including a post means, a sleeve means interfitting with said post means and an aperture in said armature loosely interfitting with said post means and said sleeve means, said means regulating said deflection of said armature; and a speed regulating means for varying the speed of said shaft, said speed regulating means including a switch for electrically connecting a diode in series with said coil, said diode eliminating one half of said alternating current thereby reducing said speed of said shaft.

18. An electric motor including the characteristics of low, constant speed and high torque comprising: an output shaft; coil means including electrical connections for applying a current thereto; a magnetic flux developed by said current passing through said coil means; core means having a plurality of field pole faces; a plurality of armatures juxtaposition said core means and said coil means and having pole faces positioned opposite said field pole faces, interaction between said magnetic flux of said coil means and said armatures causing said armatures to oscillate; a plurality of one-way clutches coupling said armatures to said shaft, said one-way clutches translating said oscillatory motion of said armatures to a unidirectional constant motion, said motion arcuately displacing said shaft in a predetermined direction at a constant speed; and means loosely interfitting with an aperture in each of said armatures regulating arcuate displacement of said armatures.

19. An electric motor including the characteristics of low, constant speed and high torque comprising: an output shaft; a coil including electrical connections for applying a current thereto; a magnetic flux developed by said current passing through said coil; a core having a plurality of field pole faces; a plurality of armatures juxtaposition said core and said coil and having pole faces positioned opposite said field pole faces, interaction between said magnetic flux of said coil and said armatures causing said armatures to oscillate; and a plurality of one-way clutches coupling said armatures to said shaft, said one-way clutches translating said oscillatory motion of said armatures to a unidirectional constant motion, said motion arcuately displacing said shaft in a predetermined direction at a constant speed; and means including a post means, a sleeve means interfitting with said post means and an aperture in each of said armatures loosely interfitting with said post means and said sleeve means, said means regulating arcuate displacement of said armatures.

References Cited

UNITED STATES PATENTS 3,351,789  11/1967  Bertling _____ 310—37

MILTON O. HIRSHFIELD, *Primary Examiner.*

D. F. DUGGAN, *Assistant Examiner.*